United States Patent

[11] 3,601,597

| [72] | Inventor | Thomas M. Dunn<br>Kansas City, Mo. |
|---|---|---|
| [21] | Appl. No. | 815,884 |
| [22] | Filed | Apr. 14, 1969 |
| [45] | Patented | Aug. 24, 1971 |
| [73] | Assignee | Ken-A-Vision Mfg. Co., Inc.<br>Kansas City, Mo. |

[54] COOLING SYSTEM FOR MICROPROJECTOR HEAD
6 Claims, 5 Drawing Figs.

[52] U.S. Cl............................................... 240/47,
353/61
[51] Int. Cl..................................................F21v 29/00,
G03b 21/16
[50] Field of Search........................................ 240/47, 11;
353/61, 57, 58, 59, 60; 352/202

[56] References Cited
UNITED STATES PATENTS
2,281,988  5/1942  Osterberg et al. ............  353/61
2,312,294  2/1943  Worthington et al. .........  240/47 X
2,568,895  9/1951  McMaster et al..............  353/57
2,818,771  1/1958  Armbruster...................  353/61
3,187,173  6/1965  Foley et al....................  240/47

*Primary Examiner*—Richard C. Queisser
*Assistant Examiner*—Ellis J. Koch
*Attorney*—Schmidt, Johnson, Hovey & Williams ABSTRACT: A cooling system for a microprojector head which has a high intensity, heat-emitting light source, the cooling system including a blower spaced from the light source, a sleeve embracing the light source and the blower, there being a plurality of baffles carried by a frame disposed within the sleeve and means for permitting air to enter the sleeve from around the lenses and the mount therefore whereby the heat emitted from the light source is directed out of the head and dispelled while cool air is drawn inwardly through the lower end of the head, thereby cooling the condensing system and the heat filter and preventing damage to the specimen.

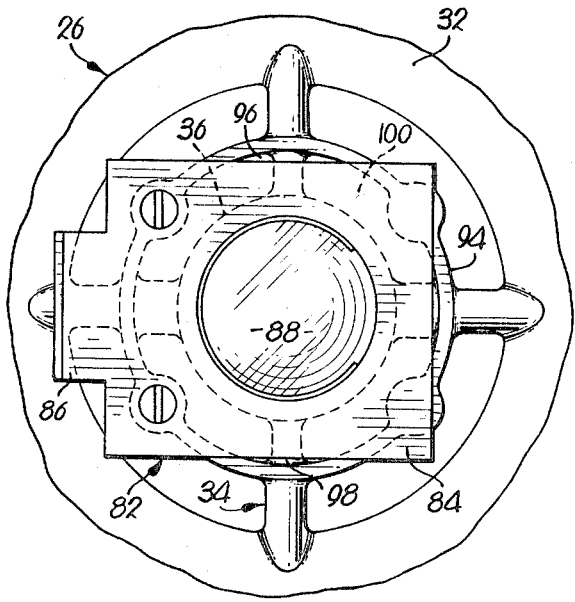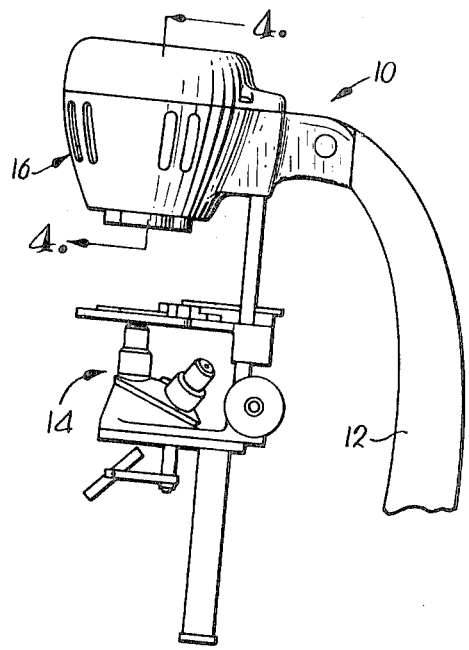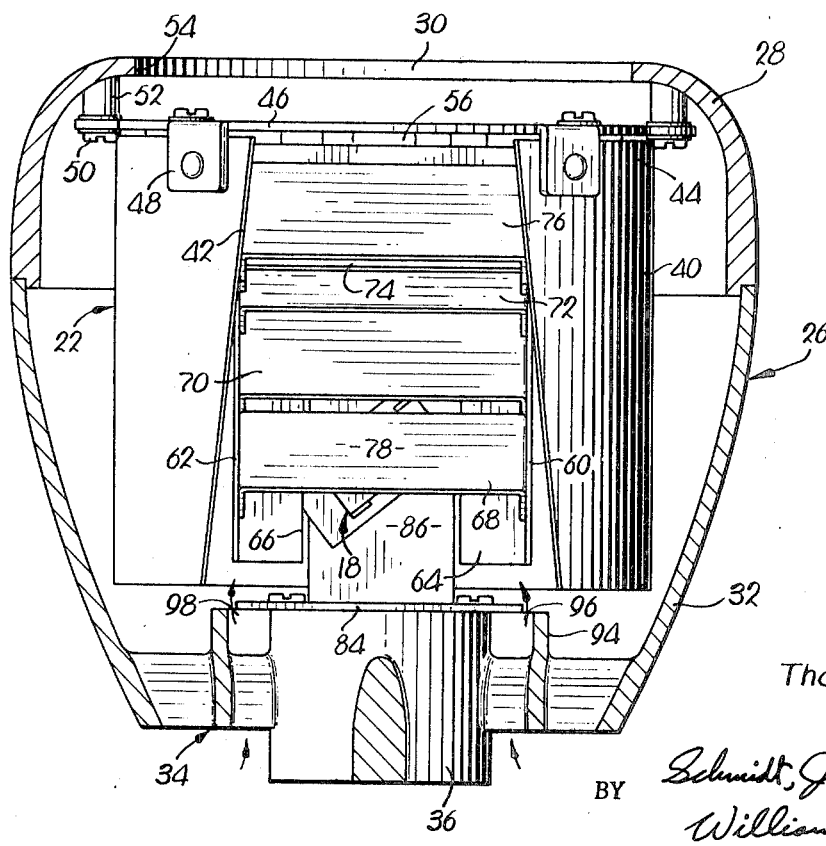

INVENTOR
Thomas M. Dunn

BY Schmidt, Johnson, Hovey, Williams & Chase.
ATTORNEYS.

COOLING SYSTEM FOR MICROPROJECTOR HEAD

It is the primary object of this invention to provide a cooling system for a microprojector head, the system being of such a nature that the head may be of essentially the conventional size but yet have disposed therewithin a light source of greater intensity than is now conventionally known, the system permitting cooling of the head and its associated components notwithstanding the substantially conventional size of the head and the oversize nature of the light source.

It is a yet further aim of this invention to provide a cooling system for a microprojector head, the system including a blower which is spaced from the high intensity heat-emitting light source, there being a sleeve of generally cylindrical configuration which embraces the light source and the blower, the sleeve having a frame disposed therewithin, which frame has a front wall and a pair of opposed sidewalls, there being a plurality of inclined baffles spanning the distance between the sidewalls whereby to direct the flow of air created by the rotation of the blade of the blower up and away from the light source while at the same time drawing air inwardly through the lower end of the head.

It is a yet further important object of this invention to provide means for permitting cooler air to enter the normally lower end of the microprojector head as the heated air is dispelled from the upper end by operation of the blade, said means including a perforate grid disposed at the lower end of the head and a lens mount positioned substantially centrally of the grid, there being open areas between the mount and the grid whereby to permit the ingress of cooled air substantially directly toward the light source, the lenses themselves being mounted in such a manner that cooler air may enter the head thereabout and directly cool the condensing system and the heat filter.

Other objects will become apparent from the following specification and accompanying drawings wherein:

FIG. 1 is a fragmentary, side elevational view of a microprojector demonstrating the head thereof which is cooled by the system hereinafter disclosed;

FIG. 4 is a sectional view taken on line 4—4 of Fig. 1; and

FIG. 5 is a view of the lower end of the head looking downwardly from a point just above the lens mount.

Figure 2:
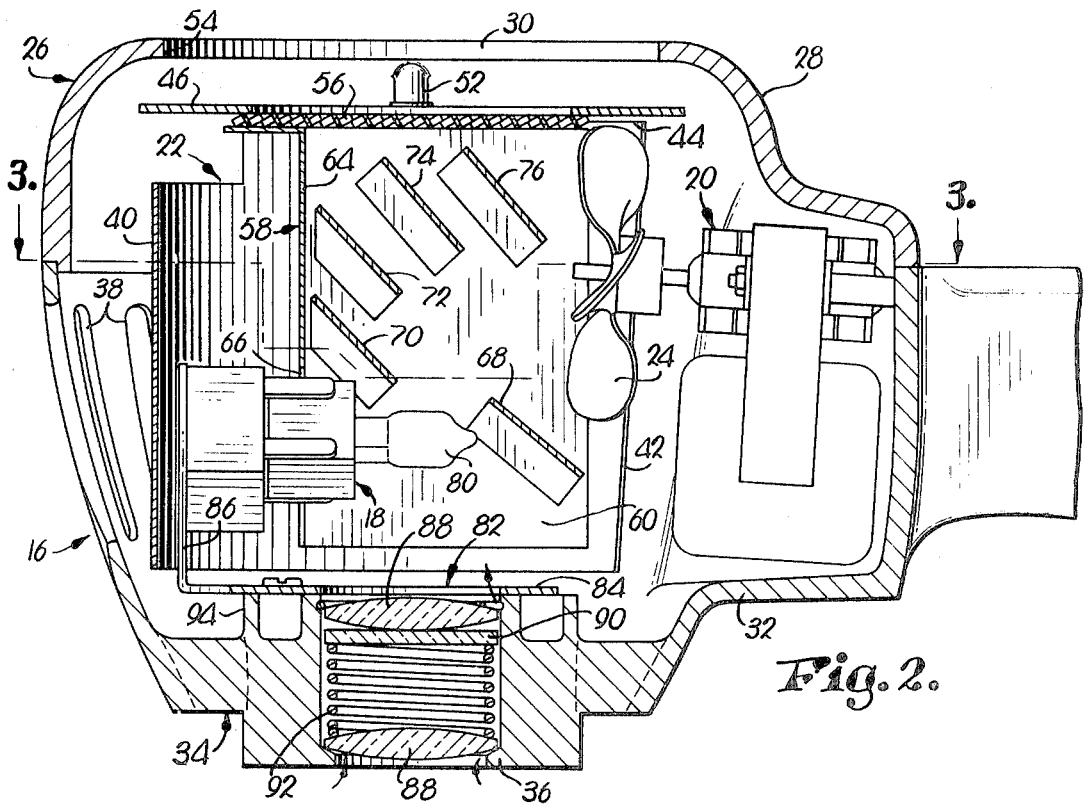
FIG. 2 is a substantially central, enlarged sectional view of the microprojector head.

The cooling system hereinafter described is particularly intended to be incorporated within the head of a microprojector 10, such microprojectors normally including a supporting stand 12, which stand carries a compound microscope 14, the head 16 being carried by the stand 12 at a position above the microscope 14 whereby a greatly enlarged image of the specimen subjected to the microscope may be projected through a suitable condensing system of lenses onto a screen.

In order to obtain the desired projection image both by way of intensity, clarity and sharpness, it is desirable to provide in the head 16 of the microprojector 10 a high intensity light source. In the past, the provision of such light sources has created a heating problem in that the heat emanated by the light source tends to raise the temperature of the head and all of its various components, including the lenses which are normally carried thereby, all to the end that projection of the microscopic object is distorted inaccurate and unclear. Also, the heat can damage the specimen or the lenses themselves as well as precluding efficient operation of the heat filter. While oversize cooling systems have been suggested in the past, the same are bulky and awkward of use and have not, therefore, been satisfactory in cooling the head of a conventional microprojector.

In the present instance, a cooling system for the head 16 of the microprojector 10 has been developed which permits use of the desirable high intensity light source such as 18, without enlarging the overall size of the head 16 or in any manner sacrificing the accuracy of the microprojector.

The cooling system essentially comprises a blower 20 which is spaced from the light source 18; a sleeve 22 which embraces both the light source and the blade 24 of the blower 20; and a plurality of baffles which are disposed within the sleeve in a specific manner to be hereinafter described. The cooling system is completely disposed within a casing 26, which casing includes a cover 28 having a hole 30 in the upper end thereof, the casing 26 also including a lower portion 32 which has a grid 34 at the lower end thereof, there being a lens mount 36 carried substantially centrally of the grid 34 and receiving the condensing system. The casing 26 and, more particularly, lower portion 32 thereof, is provided with a plurality of spaced-apart apertures 38 along the wall thereof, said casing 26 being generally cylindrical in configuration as is illustrated in the drawings.

The sleeve 22 is generally cylindrical in configuration and has a continuous sidewall 40, the same having a slot 42 in one portion thereof, the slot 42 permitting the blade 24 of blower 20 to extend within the confines of the sleeve 22. Sleeve 22 is secured at its upper edge 44 to an annular plate 46 as by brackets 48, and plate 46 is, in turn, secured to the upper portion 28 of casing 26 as by screws 50, the screws being provided with spacers 52 whereby to cause plate 46 to be spaced downwardly from the edge 54 of hole 30. A perforate grill 56 is carried by annular plate 46 whereby to permit the egress of air through grill 56 and from the casing 26 through hole 30 when the cooling system is in operation.

Figure 3:
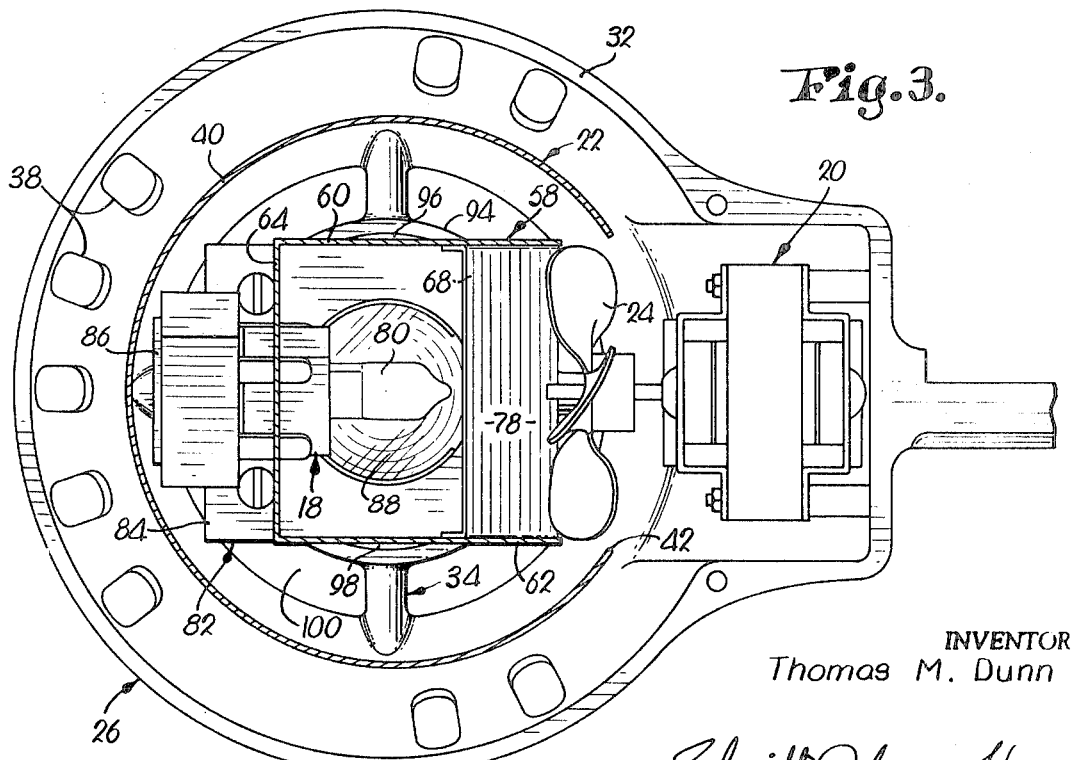
FIG. 3 is a sectional view taken along line 3—3 of FIG. 2.

A frame 58 is disposed within the sleeve 22, the frame 58 having a pair of opposed sidewalls 60 and 62 and a front wall 64, said front wall being in opposed relationship to the blade 24 and provided with a notch 66 whereby light source 18 may extend to within the confines of the frame 58, all as is clearly shown in Figs. 2 and 3 of the drawings. The rear end of frame 58, that is the end which receives blade 24, is open.

A plurality of baffles span the distance between the sidewalls 60 and 62 of the frame 58, all of said baffles being inclined with respect to the horizontal and there being a first baffle 68 and a plurality of additional baffles 70, 72, 74 and 76. The first baffle 68 is in an inclined plane generally below the normally lowermost edge of blade 24, although a portion of the face 78 of said baffle extends into a horizontal plane within the confines of the extended edges of blade 24, said baffles, and more particularly baffle 68, causing air which is moved forwardly by blade 24 to pass upwardly and over the bulb 80 of light source 18 whereby to prevent air from being blown directly on the bulb 80. The additional baffles 70-76 serve to direct the air which is moved toward said baffles by blade 24 in such a manner that it will pick up the heat rising from bulb 80 and carry the heated air upwardly within the confines of frame 58 and through grill 56 and hole 30 into the atmosphere, it being noted that the upper edges of the walls 60, 62 and 64 of the frame 58 are secured to the lower face of the grill 56, all as clearly shown in Fig. 2 of the drawings. Thus, heat which is emitted from the bulb 80 when the high intensity light source is in operation, is moved upwardly and outwardly of the head 16 by virtue of the operation of blade 24 and the baffling structure which is disposed in proximity to the blower and the light source.

It will be appreciated that, when the blower is actuated and the blade 24 is moving the heated air upwardly and outwardly of the head 16, a vacuum effect will be created in the area of the head below the light source, which effect will serve to draw cool air into the head 16 whereby the air which is moved by the blade 24 may be as cool as possible.

In order to permit the ingress of cooler air into the area defined by sleeve 22, the plate 82 which is provided to support the light source 18, is positioned in such a manner with respect to the lens mount 36, that a pair of spaced-apart open areas are provided on each side of the plate 82. More particularly, plate 82 has a horizontal stretch 84 and a vertical, reduced stretch 86. The horizontal stretch 84 is in the nature of a reflective plate overlying the lens mount and the condensing system to prevent excess heat from reaching the lenses 88 and the heat filter 90, the stretch 84 being provided with an opening which is in alignment with the series of lenses 88 which are carried in the lens mount 36. It should be noted that the lenses 88 and phosphate heat filter 90, are mounted in series within the lens mount 36 and retained in place by a coil spring 92, as best seen in Fig. 2, whereby air may be drawn upwardly through the lens mount and directly past the lenses 88 and heat filter 90. This permits direct cooling of the condensing system when the blower is operating; prevents the buildup of heat in the area between the lenses 88; and, by cooling the heat filter 90 aids it in performing its intended function. Were it not for this cooling effect, the condensing system would not function properly due to excess heat and the specimen being subjected to the microprojector would be killed if alive or ruined by the heat if not a live specimen.

The grid 34 which is provided at the lower end of the casing 26 presents a centrally disposed boss 94 which surrounds the lens mount 36, the horizontal stretch 84 of the plate 82 being in overlying relationship to the boss 94, but the edges of the horizontal stretch 84 of plate 82 being spaced slightly inwardly from the boss 94 whereby to present said open areas 96 and 98 on each edge of the stretch 84 of plate 82 to permit cool air to be drawn upwardly around lens mount 36.

The grid 34 is perforate and presents a plurality of openings such as 100 whereby ingress of air along the entire lower face of the casing 26 is permitted under the influence of the vacuum effect which is created by the operation of blower 20. Such air, when entering the head 16, is cooler than that which is being driven therefrom and which is above the light source 18 and the provision of multiple areas for permitting the air to enter the sleeve 22 directly past the lenses 88 and around the mount 36 as well as through grid 34 allows a sufficient amount of cool air to reach the light source to maintain the same in a cooled condition and to dispel the heat which is emitted from the high intensity light source.

Thus there is provided a cooling system for a microprojector head which is of generally conventional size but which is configured and designed in such a manner that a maximum flow of cooled air through the head is permitted to thereby allow the utilization of a higher intensity, greater heat-emitting light source than has heretofore been possible in such microprojector heads.

I claim:

1. A cooling system for a microprojector head having a high intensity, heat-emitting light source therein, said system comprising:
    a blower spaced from said light source;
    a sleeve embracing said light source and said blower,
    said sleeve having a frame disposed therewithin including a pair of opposed sidewalls and a front wall, said light source extending through said front wall;
    a condensing system including a series of lenses disposed below said light source;
    means permitting air to enter said sleeve through and around said condensing system; and
    a plurality of baffles within said sleeve carried by the frame and spanning said sidewalls for directing air from said blower in a path to dispel the heat emitted from said light source and thereby cool said head, said blower having a blade spaced across said frame from the light source,
    said baffles being between the blade and the light source,
    said baffles being inclined with respect to the horizontal whereby to direct air from said blade upwardly above said light source and out of the frame, thereby enhancing the vacuum effect below the light to draw cool air into said frame.

2. The invention as set forth in claim 1, said baffles including a first baffle lying in an inclined plane generally below the edge of said blade and a plurality of additional baffles lying in vertically spaced, inclined planes above said light source and between the normally upper and lower edges of said blade.

3. The invention as set forth in claim 2, said head including a casing surrounding said sleeve, said casing having a hole at the upper end thereof and a perforate grid at the lower end thereof to permit the ingress and egress of air.

4. The invention as set forth in claim 3, said grid having a lens mount positioned substantially centrally thereof for carrying said condensing system, there being a plate overlying said mount, there being open areas between said plate and said grid for permitting the passage of air to said frame.

5. The invention as set forth in claim 4, said sleeve being cylindrical in cross-sectional configuration, said frame being rectangular in cross-sectional configuration.

6. A cooling system for a microprojector head having a high intensity, heat-emitting light source therein, said system comprising:
    a blower spaced from said light source;
    a sleeve embracing said light source and said blower;
    a condensing system including a series of lenses disposed below said light source;
    means permitting air to enter said sleeve through and around said condensing system; and
    a plurality of baffles within the sleeve between the blower and the light source,
    said baffles being inclined with respect to the horizontal whereby to direct air from the blower upwardly above said light source and out of the sleeve, thereby enhancing the vacuum effect below the light source to draw cool air into said sleeve.